United States Patent [19]

Kim

[11] Patent Number: 4,958,832

[45] Date of Patent: * Sep. 25, 1990

[54] STATIONARY EXERCISING BICYCLE APPARATUS

[76] Inventor: Sang-Sup Kim, 178 E. Columbia, Des Plaines, Ill. 60016

[*] Notice: The portion of the term of this patent subsequent to May 15, 2007 has been disclaimed.

[21] Appl. No.: 344,016

[22] Filed: Apr. 26, 1989

Related U.S. Application Data

[63] Continuation-in-part of Ser. No. 56,856, Jun. 1, 1987, Pat. No. 4,925,183.

[51] Int. Cl.⁵ ............................................... A63B 21/00
[52] U.S. Cl. ..................................................... 272/73
[58] Field of Search ............................. 272/73; 434/61

[56] References Cited

U.S. PATENT DOCUMENTS

| | | | |
|---|---|---|---|
| 554,754 | 2/1896 | Webber | 272/73 |
| 2,623,302 | 12/1952 | Shields | 272/73 |
| 4,415,152 | 11/1983 | Smith | 272/73 |
| 4,580,983 | 4/1986 | Cassini et al. | 434/61 |
| 4,743,012 | 5/1988 | Kim | 434/61 |

Primary Examiner—Stephen R. Crow
Attorney, Agent, or Firm—Charles F. Lind

[57] ABSTRACT

The disclosed stationary exercise bicycle apparatus has a road device unit supporting a substantially free-wheeling endless treadmill, and a motion coordinator for coupling a substantially conventional bike unit with both its steering and drive wheels riding on the treadmill. The motion coordinator has a rail extended crosswise to and over the upper exposed run of the treadmill, and under the rotatable pedals of the bike unit. A pair of laterally rigid telescoping members are secured firmly between the bike unit and the rail. The securing structure includes a guide carried on the rail that holds the bike unit substantially fixed longitudinally on the treadmill and that allows lateral steering and limited tilting of the bike unit relative to the treadmill, to simulate riding the bike unit on a real road surface.

12 Claims, 4 Drawing Sheets

U.S. Patent  Sep. 25, 1990  Sheet 1 of 4  4,958,832
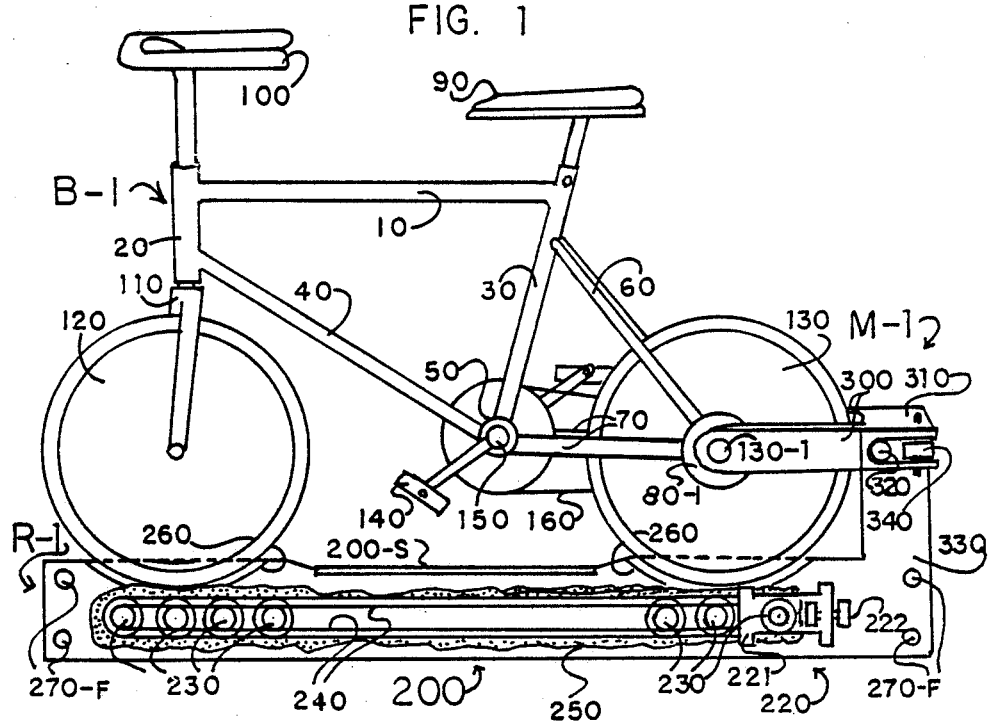
FIG. 1
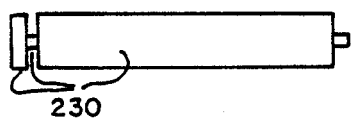
FIG. 2
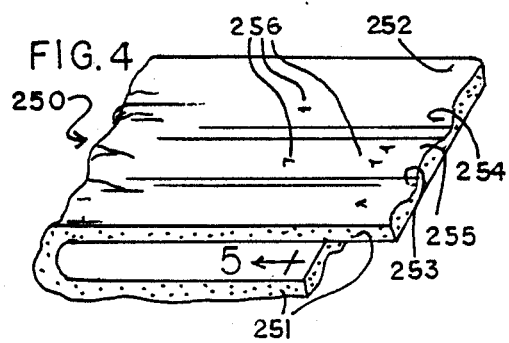
FIG. 4
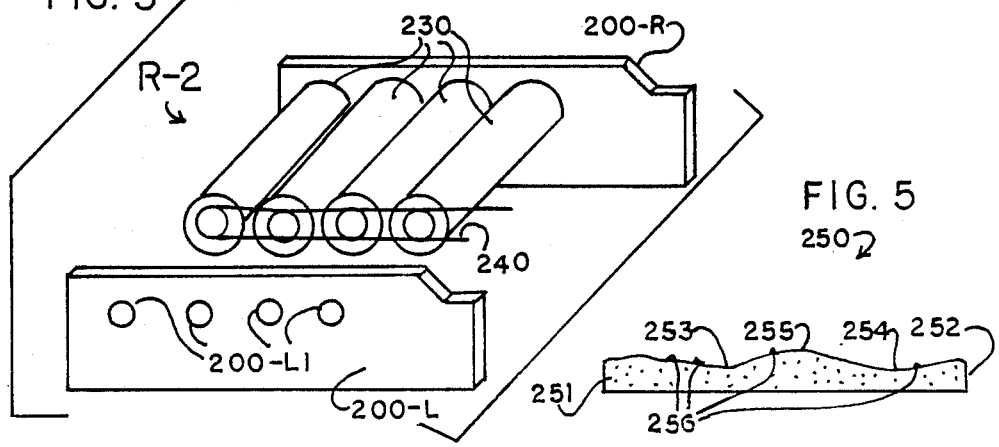
FIG. 3
FIG. 5

STATIONARY EXERCISING BICYCLE APPARATUS

RELATED APPLICATION

This application is a continuation-in-part of my co-pending application filed Jun. 1, 1987 having Ser. No. 07/056,856, issued May 15, 1990 as Pat. No. 4,925,183, and entitled Indoor-Rollbike Apparatus.

BACKGROUND OF INVENTION

Heretofore, bicycle type exercising apparatus have been constructed to operate as stationary bicycles, with the wheels off the ground, and drag wheel members or braking means providing resistance against which the rider pedals. The wheel rolled in the air, not on a road means, and exercising on such apparatus prove to be very monotonous.

By contrast, the present invention, consisting of a bike unit, a road device unit, and a motion coordinator means, has the rider do more than just pedal; but while the rider pedals, the bike unit must also be steered and kept in balance, thus causing the rider to move his body, voluntarily and involuntarily.

Although the bike unit cannot fall off the road device unit or fall down completely, care must be taken to keep the bike unit upright and rolling. Keeping one's balance is a great part of riding a bicycle, as the torso must constantly move to account for the different positions of the legs when pedaling and for the bumps that may be encountered on the road, and for the different positions of the handlebars, etc. This forces the stomach, the back and the rest of the body to constantly make adjustments and thereby provide additional exercise. The arms, shoulders and the back are also exercised while pedaling, when keeping balance and also while turning. The present invention also provides greater pleasure to the rider.

No known commerical bicycle type exercising apparatus has incorporated the important features and functions of actual bicycle riding, including: handlebars that can be moved and steered, wheels that roll ovler a simulated road surface while providing a feedback of the road surface, and rider input to keep the apparatus in balance, while in a limited area, indoors or outdoors. This invention will simulate these important features of riding a bicycle, thereby giving the benefits of riding while increasing the pleasures of exercising.

SUMMARY OF THE INVENTION

The invention relates to a stationary exercising apparatus utilizing a bicycling device which enables the rider to achieve the results of riding a bicycle, complete with functional pedals and wheels that roll over a simulated road surface, and handlebars that need to be steered to keep one's balance.

This invention includes a road device unit, a motion coordinator means, and a bike unit coupled to the road device unit by the motion coordinator means. The road device unit provides the various road conditions over which the bike unit rolls, and the motion coordinator means allows the bike unit sufficient degrees of freedom to be steered in keeping the bike unit balanced on the road device unit.

It follows that objects of the present invention are:
(1) to provide a novel and improved indoor apparatus to be used with a bicycle type device for exercising the many muscles throughout the entire body that are normally exercised when riding a bicycle outdoors, but while riding indoors; and to do so in a manner that is enjoyable and restful for the mind;
(2) to provide an ideal all weather exercising device, as a realistic alternative for cyclists who must continue bicycle training in inclement weather;
(3) to provide a suitable exercising apparatus to help keep athletes in condition; and
(4) to provide a device for those wishing to learn to ride a bicycle without the pain of falling off while learning.

With the foregoing and other objects in mind, my invention comprises constructions, combinations and arrangements of parts as hereinafter described and illustrated in the accompanying drawings.

BRIEF DESCRIPTION OF THE DRAWINGS

FIG. 1 is a left side elevational view of an indoor-rollbike apparatus constructed according to the principles of the invention.

FIG. 2 is a frontal elevational view of a roller component used in the road device unit R-1 of FIG. 1.

FIG. 3 is an exploded perspective view of cooperative parts of road device unit R-1 of FIG. 1.

FIG. 4 is a perspective view of part of the endless road means used on the road device unit R-1 of FIG. 1.

FIG. 5 is an enlarged cross sectional view of the road means as seen generally from line 5—5 in FIG. 4.

DESCRIPTION OF THE PREFERRED EMBODIMENTS

Figure 6:
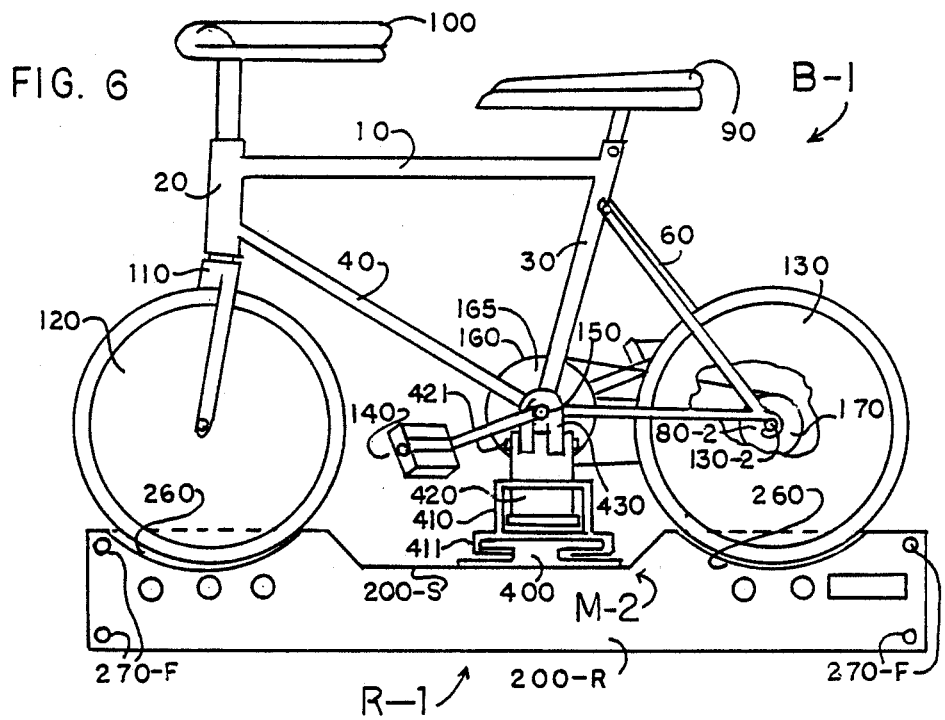
FIG. 6 is a left side elevational view of another indoor-rollbike apparatus constructed according to the principles of the invention.
Figure 12:
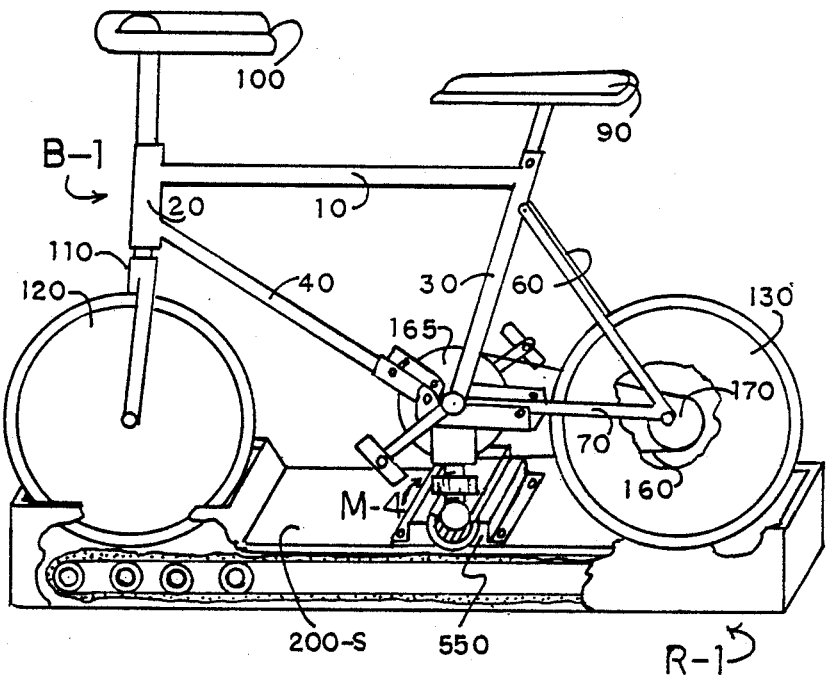
FIG. 12 is a left side elevational view of yet another indoor-rollbike apparatus constructed according to the principles of the invention.

FIGS. 1, 6 and 12 show several embodiments of the indoor-rollbike apparatus each comprising a bike unit (B-1), a road device unit (R-1), and a motion coordinator means (M-1, M-2, M-3, M-4, M-5, or M-6). The bike unit B-1 depicted in each figure is substantially similar, and accordingly, similar components are identified by the same reference numbers in these figures.

BIKE UNIT B-1

The bike unit B-1 may be similar to a conventional bicycle. Thus, the bike unit B-1 is illustrated as having a top tube member 10, a head tube member 20 which has its upper rear portion firmly connected with the front end of the top tube member 10, and a seat tube member 30 which has its upper, front portion firmly attached to the rear end of the top tube member 10. A down tube member 40, which extends down and rearwardly, has its upper end firmly connected with the lower end, rear portion of the head tube member 20, and the lower end of the down tube member 40 and the lower end of the seat tube member 30 meet at and are connected to a pedal crank housing 50. Left and right seat stay members 60 extend down and back, and their upper ends are firmly attached to the left and right sides, respectively, of the upper portion of the seat tube member 30. Left and right chain stay members 70 have their front ends firmly attached to said pedal crank housing member 50. A pair of catch plates 80-1 are provided at the junction where the lower ends of the seat stay members 60 and rear ends of the chain stay members 70 meet and are connected together. A seat and a seat post, represented generally by 90, is mounted in the seat tube member 30. A handlebar assembly 100 and a front fork assembly 110 are mounted on the head tube member 20, and a front wheel 120 is mounted on the front fork assembly 110. The handlebars 100 can be rotated about the axis of the head tube member 20 in order to steer the bike unit and to provide balance for the bike unit. A driven wheel 130 with a driven wheel axle member 130-1 is mounted on the catch plates 80-1. Pedal means 140 are mounted on a crank having a central axle shaft 150 rotatably mounted in the crank housing 50; and means for transferring the rotational energy from the pedal means 140 to the driven wheel 130 is represented generally as a chain 160 trained over sprockets 165 and 170 keyed respectively to the central axle shaft 150 and to the driven rear wheel 130.

ROAD DEVICE UNIT R-1

The components of the road device unit R-1 are numbered starting from 200 and are illustrated in FIGS. 1, 2, 3, 4, 5, 6, 7, 12, 16 and 17. The road device unit R-1 includes a pair of elongated longitudinal left and right side members 200-L, 200-R attached firmly to transverse front and rear members 210-A, 210-B, to form a durable 4-sided frame. Members 200-L, 200-R and 210-A, 210-B are preferably durable metal plates and may be welded together in a preferred method of fabrication.

The left and right side members 200-L, 200-R have a plurality of transversely aligned openings containing suitably durable and well lubricated bearing retainers, illustrated generally by 200-L1, in FIG. 3, and rotatable members with axle shafts and sprockets, illustrated generally by 230 in FIG. 2, are mounted in the side members. As shown in FIG. 3, a rotational force transferring means 240, preferably a chain member, is mounted about sprockets of the rotatable members 230. A road means 250 is looped about the rotatable members 230, forming a closed loop that spans between the left and right side members 200-L, 200-R and comprises an endless treadmill upon which the bike unit can roll. The rotatable members 230 of the road device unit of R-1 thus all rotate together, under the road means 250 and under the wheels 120 and 130 of the bike unit B-1. As shown in FIG. 1, a road tension adjusting means 220 is provided between the side members of the road device unit and has a sliding member 221 that rotatably holds the end rotating member 230. A screw 222 is part of the road tension adjusting means 220, operable to provide adjustment of the sliding member 221, back and forth when the screw 222 is turned, to adjust the rotating member 230 also back and forth for adjusting the tension of the means 250. Stepping platform 200-S is mounted on the top of the middle portion of the left and right side members 200-L, 200-R, covering with clearance the road means 250 that rolls underneath. This provides safety and protection for the rider who can stand on the platform to mount and dismount the bike unit B-1, rather than standing on the road means 250 which could accidentally move or be damaged by the rider's feet.

The road means 250 may have an uneven surface comprised mainly of longitudinally extended high and low zones extended around the endless loop of the road means, and some irregular bumps may also be on each zone. This is illustrated in FIGS. 4 and 5 as high side edge zones 251 and 252, and high central zone 255, separated by the low zones 253 and 254; and by the bumps 256 randomly scattered about across these zones.

Each of the bike wheels 120 and 130 is adapted to ride on the upper run of the endless road means 250. In the illustration of FIGS. 1, 6 and 12, the rider may steer the bike unit B-1 from side to side freely between the opposite side members, but even then the wheel(s) can rub against wheel guide means 260 formed on the side members, to be retained on the road device unit R-1.

When riding on the road means 250, the front wheel will basically be steered longitudinally along the road means parallel to the high and low zones, but the steering will typically direct the wheels laterally as well. This will cause the front wheel 120 to ride from one high zone across a low zone, to the adjacent high zone, and possibly then back again. The front wheel will more typically transfer laterally between the longitudinally extended zones, but the rear wheel will generally follow the lateral movement of the front wheel, at least part way. This transfer across the uneven heights of the adjacent longitudinally extended zones 251, 253, 255, 254 and 252 provides some feedback steering, and causes the rider to assume an active part to compensate for this feedback steering in order to maintain the bike unit on a substantially longitudinal course along the treadmill. The local irregularities 256 further add to the realsim of riding a conventional bike on an outdoor bumpy roadway. As the endless treadmill, having the exposed upper run and the hidden lower run, is at least twice the wheel base of the bike unit, the same irregularities need not be hit by the front wheel (or by rear wheel) each time the treadmill rotates, as the wheel could be and probably will be steered laterally to one side or the other of the irregularity.

MOTION COORDINATOR MEANS M-1

The components of motion coordinator means M-1 are illustrated in FIG. 1, and will be represented by numbers starting from 300. The motion coordinator means M-1 comprises an elongated member having bike holding arms 300 at the front end, and tail arms 310 at the rear end. The bike holding arms 300 are connected near their front end onto the bike unit, preferably at the driven wheel axle member 130-1, whereby the driven wheel 130 can be rotated. The tail arms 310 support rotatablly between them cylindrical bearing members 340. A transversal member 320 is supported above the road means 250 by spaced arms 330 secured to the side members of the road device unit R-1, as by welding, and is fitted in the opening defined between the tail arms 310 and the cylindrical bearing member 340.

The attached bike unit B-1 can be steered to move from side to side relative to the moving road means 250, and the bearing member 340 will shift axially along the transversal member 320 without undue friction generated by the motion coordinator means M-1. The bike unit B-1 moreover can lean from side to side until the leaning is stopped by the transversal member 320 coming against the edges of the tail arms 310. The motion coordinator means M-1 also allows the bike unit B-1 to shift up and down as it rolls on the uneven surfaces of the moving road means 250 and the longitudinally extended high and low zones. Therefore, this motion coordinator means M-1 allows the bike unit to ride on the road device unit R-1, much as a bicycle riding on a road, although it does not allow the bike unit B-1 to fall down completely even if the rider fails to keep the bike unit in balance. The motion coordinator means M-1 is covered in the above identified copending application.

MOTION COORDINATOR MEANS M-2

Figure 8:
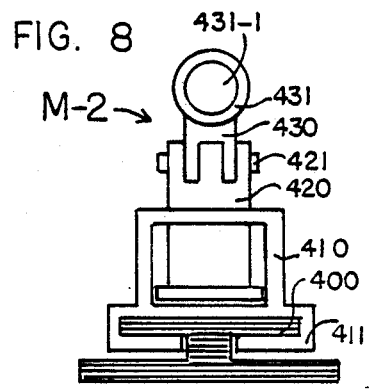
FIG. 8 is an elevational sectional view illustrating coordinating parts of the motion coordinator means M-2, viewed from the side of the indoor-rollbike apparatus of FIG. 6.
Figure 9:
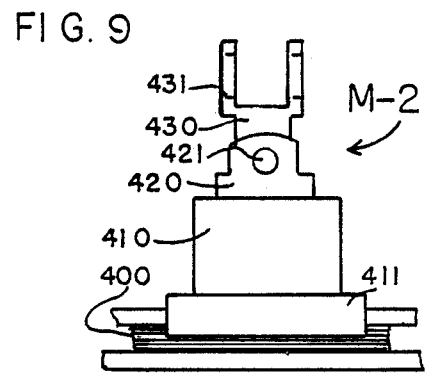
FIG. 9 is a side elevational view of the motion coordinator means M-2 of FIG. 8.
Figure 7:
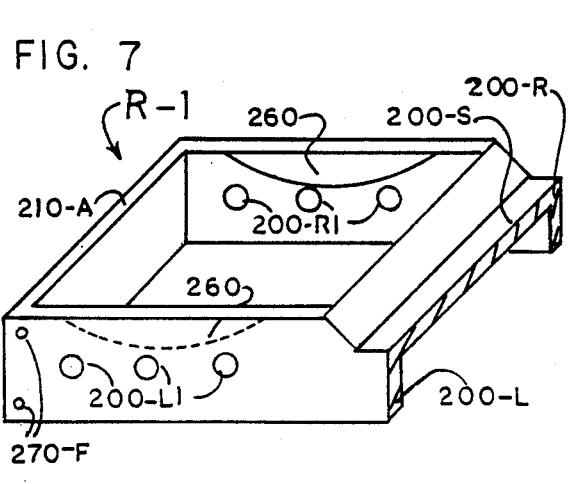
FIG. 7 is a perspective view of part of the road device unit R-1 used in FIGS. 1 and 6.

FIGS. 6, 8 and 9 illustrated the motion coordinator means M-2. The bike unit B-1 is similar to that already disclosed, except that the catch plates 80-2 are of the size found on conventional bicycles. The motion coordinator M-2 is different in structure and where it is attached to both the bike unit B-1 and the road devicei unit R-1, and its components are numbered starting from 400.

The motion coordinator means M-2 has a rail member 400, preferably in the shape of an I-beam, securely mounted on the stepping platform 200-S of the road-device unit R-1, as by welding. An external cylinder member 410 has at its bottom a rail holding means 411 which is shaped to be trapped on but axially slide along the I-beam shaped rail member 400 without falling off, as a carrier member.

An internal cylinder member 420 is fitted in the external cyclinder member 410 so that it can be rotated and raised and lowered with respect to the external cylinder member 410. A bike holding member 430, hingedly connected by an axle or pin member 421 to the internal cylinder member 420, has at its upper end two bike holding arms 431 each with an axle attaching opening and suitable bearing retainer 431-1, for holding the central axle shaft 150 of the bike pedaling crank. This allows the bike unit B-1 to see-saw with the motion coordinator means M-2 as the fulcrum and with the bike wheels 120 and 130 rolling on the road means 250. The bike unit B-1 can also lean from side to side but can not fall down completely due to the narrow gap allowed between the hinged internal cylinder member 420 and the bike holding member 430. The bike unit B-1 can also be steered, and raised or lowered when it rolls on uneven surfaces of the moving road means 250, because of the telescoping and rotating cylinder members 410 and 420.

Therefore, this system allows the bike unit B-1 similar freedom to ride on the road device unit R-1, much as a bicycle riding on a road, while preventing the bike unit B-1 from falling down completely.

MOTION COORDINATOR MEANS M-3

Figure 10:
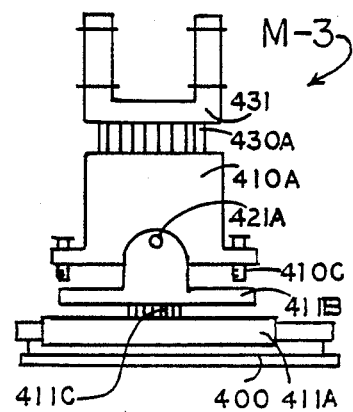
FIGS. 10 is a side elevational view, corresponding to FIG. 9 of an alternate embodiment motion coordinator means M-3.

FIG. 10 illustrates a slightly modified motion coordinator means M-3, having the components that are similar to those of the M-2 embodiment numbered the same. The motion coordinator means M-3 has the I-beam shaped rail member 400, with a carrier member 411A shaped to be trapped on but to slide axially along the rail member 400 without falling off. A disk member 411B is coupled by shaft 411C to rotate on the rail carrier member 411A and an exterior cylinder member 410A is pivoted by pin 421A to spaced ears of this disc member. An internal cylinder member 430A fits telescopically within the external cylinder member 410A. The internal cylinder member 430A can thus be raised and lowered with respect to the external cylinder member 410A, but can not be rotated. A bike holding means is formed on the internal cylinder member 430A and has two arms 431 each with an axle attaching opening and suitable bearing retainer for holding the central axle shaft 150 of the bike pedaling crank. The motion coordinator M-3 thus allows the bike unit B-1 to lean from side to side due to the hinged external cylinder member 410A, and to be steered because the disc member 411B can be rotated. The bike unit B-1 can also be raised or lowered when it rolls on uneven surfaces of the moving road means 250, because of the telescoping cylinder members 430A and 410A. The location of the pivot pin 421A adjacent the lower end of the telescopic cylinder members allows the bike unit B-1 to lean from side to side, without the pedals 140 hitting any of the motion coordinator means M-3. A tilt control means 410C is provided on the cylinder member 410A at its left and right sides adjacent its lower edge portion, and can include a screw threaded into ears on the cylinder member 410A to different heigths, to provide narrower or wider gaps about the upper surface of the disk member 411B, in order to allow selective degrees of tilting of the cylinders relative to the rail member 400 and thus of the bike unit rolling on the treadmill.

Figure 11:
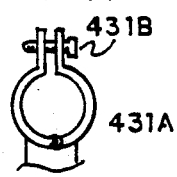
FIG. 11 is an elevational view of an alternate embodiment of the bicycle holding device portion of the motion-coordinator means.
Figure 13:
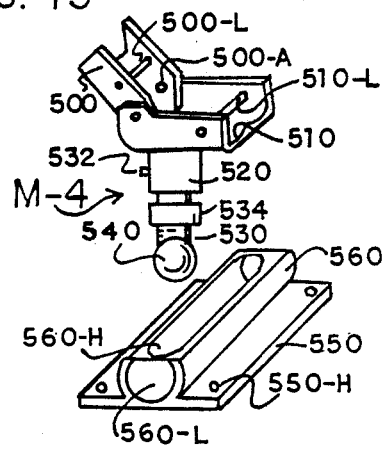
FIG. 13 an exploded perspective view illustrating cooperating parts of the motion coordinator means M-4 used in FIG. 12.
Figure 14:
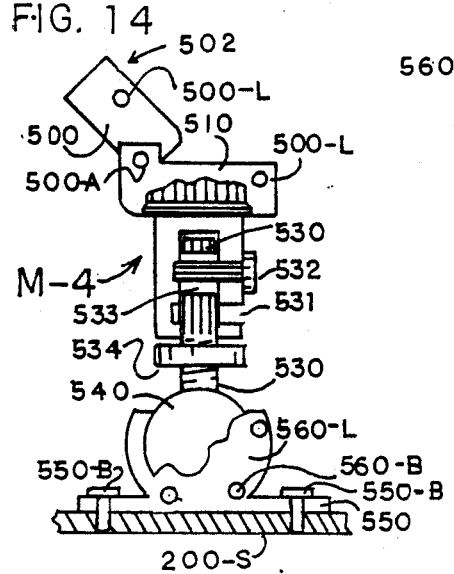
FIG. 14 is an enlarged elevational section of the motion coordinator means M-4, as viewed from the left side of indoor-rollbike apparatus of FIG. 2.
Figure 15:
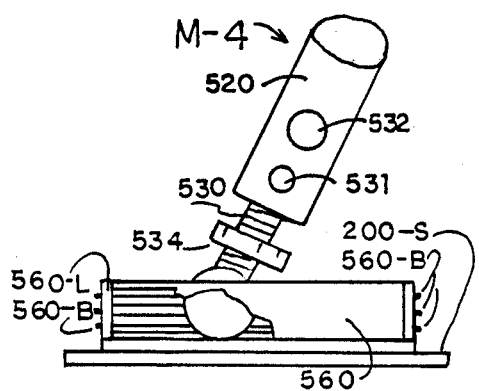
FIG. 15 is a side elevational view of the motion coordinator means M-4 of FIG. 14.
Figure 16:
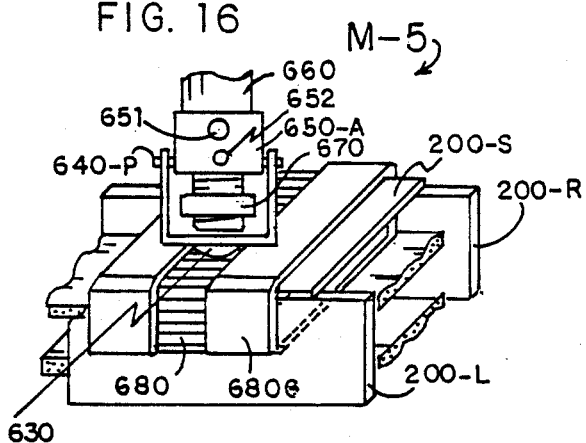
FIG. 16 is a perspective view, partly broken away and in section, of an alternate embodiment motion coordinator means M-5.

The bike holding arms 431 illustrated in FIG. 10 can be replaced with a pair of clamping means 431-A (see FIG. 11) each comprising two semi-circular fingers connected together by a pin at corresponding ends, and the opposite ends of the fingers having aligned holes that receive threaded nut and bolt members 431-B. The fingers may be opened to fit around the crank pedal housing 50 of the bike unit, and then clamped together to hold the bike unit B-1 relative to the extendable cylinder members.

MOTION COORDINATOR MEANS M-4

FIG. 12 illustrates bike unit B-1, road device unit R-1, and motion coordinator means M-4. The bike unit B-1 is conventional and the motion coordinator means M-4, although different in structure from the M-2 and M-3 means, is attached to the bike unit B-1 and the road device unit R-1 at the same locations. In the disclosure that follows the components of the motion coordinator M-4 are numbered starting from 500.

The motion coordinator means M-4 has a rail member 560 secured at mounting plate 550 to the stepping platform 200-S of the road device unit R-1 by members 550-B being fitted through openings 550-H and threaded into the platform. The rail member 560 defines an elongated cylindrical cavity with end plates 560-L secured by bolts 560-B to the rail member across the ends of the cavity to close it. A spherical ball member 540 is adapted to fit within the cavity to slide along its length and to swivel or rotate freely therein. The ball member 540 is formed at the end of internal cylinder member 530. An external cylinder member 520 cooperates telescopically with the internal cylinder member 530 so that it can be raised and lowered with respect to the stepping platform 200-S. A bike holding means 502 is mounted on the upper end of the external cylinder member 520, suited to be easily secured to the bike unit B-1. The bike holding means 502 has U-shaped members 500 and 510 pivoted together at pin 500-A, each member being sized to fit around the down tube member 40 and chain stay member 70 respectively. Securing means 500-L in the form of a threaded bolt and nut for example can be tightened to hold the bike unit B-1 relative to the motion coordinator means M-4. A pin 532 held in any selected opening 531 in the external cylinder member 520, and fitted in an elongated opening 533 in the internal cylinder member 530, allows limited movement telescopically of these members. This allows the bike unit B-1 to see saw with the motion coordinator means M-4 as the fulcrum and with the bike wheels 120 and 130 on the road means 250, to be raised or lowered when it rolls on uneven surfaces of the moving road means 250. The bike unit can lean from side to side due to the spherical member 560. A sleeve 534 threaded on the internal cylinder member 530, when properly adjusted, has an end surface that is adapted to butt against the upper edges of the rail member 560 to limit the degree the bike unit can lean from side to side. Antifriction means, such as bearings (not shown), can be provided between the sleeve abnd rail member 560 to minimize drag and allow lateral movement of the spherical member 540 when binding occurs upon excessive tilting. However, if the sleeve 534 is tightened down solidly against the rail member 530, the bike unit can be held upright and at a fixed spot over the rail member 560.

MOTION COORDINATOR MEANS M-5 AND M-6

Motion coordinators means M-5 and M-6 are closely related and will be disclosed together, with the components indentified by numbers starting from 600.

Figure 20:
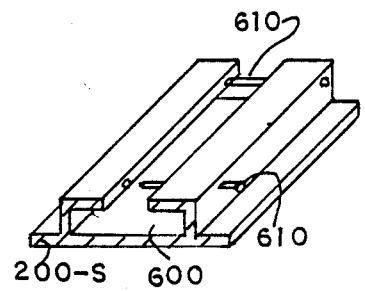
FIGS. 20 and 21 are perspective views of components, partly broken away and in section forming the motion coordinator M-5.
Figure 17:
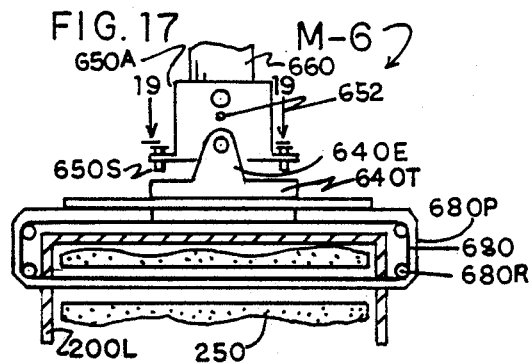
FIG. 17 is an elevational section of the motion coordinator means M-5 of FIG. 16.
Figure 21:
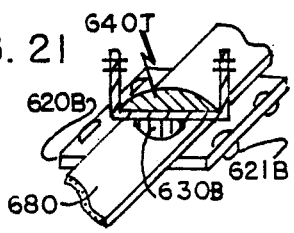
Figure 22:
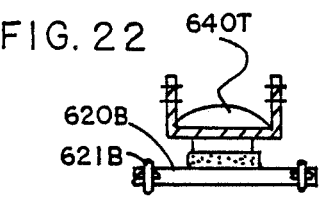
FIG. 22 is an elevational view of the components illustrated in FIG. 21.
Figure 18:
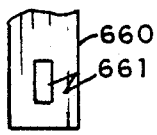
FIG. 18 is an elevational view of an interior cylinder member used with the motion coordinator means M-5.
Figure 23:
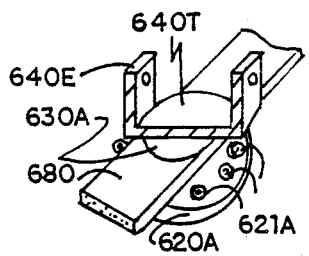
FIGS. 23 and 24 are views corresponding to FIGS. 21 and 22, of an alternative embodiment motion coordinator means M-6.
Figure 19:
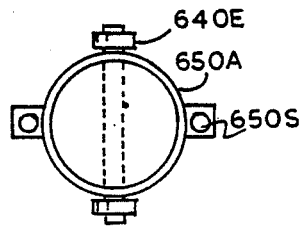
FIG. 19 is a sectional view of the cooperating parts as seen generally from line 19—19 in FIG. 17.
Figure 24:
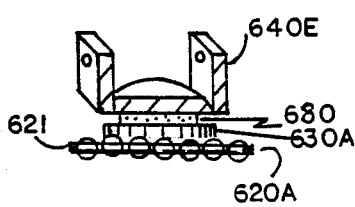

The motion coordinator means M-5 (FIGS. 16, 23 and 24) and M-6 (FIGS. 17-22) have structural rail members 600 spanning between the side members and defining an elongated T-shaped cavity. A carrier member 620A or 620B fits in the T-shaped cavity of the rail member 600, and has a plate portion that holds ballbearing means 621A or wheel means 621B exposed to the top and bottom facing surfaces of the rail member, so that the carrier member can freely travel along the rail member from side to side of the treadmill 250. Pins 610 (see FIG. 20) supported in aligned openings of the rail member are adapted to be butted by the carrier member to stop it at each side of the treadmill. The plate of the carrier means 620A is round to rotate about its axis on the bearing means 621A as well as to move side to side, while the plate of carrier means 620B is rectangular to move side to side only. A post 630A or 630B is supported in the plate portion of the carrier means 630A or 630B and has at its upper end a yoke having a flat top 640T and spaced upstanding ears 640E. An exterior cylinder member 650A or 650B is pivoted by a pin 640-P to the spaced ears 640E. An internal cylinder member 660 fits in the external cylinder member, and a pin held in any of several selected pairs of openings 652 in the external cylinder member, and fitted in a vertically elongated opening 661 in the internal cylinder member 660, allows limited telescopic movement of these members. The post 630A can be fixed as by welding to the round plate of the carrier means 620A, while the post 630B is mounted to rotate relative to the rectangular plate of the carrier means 620B. This allows the bike holding means (not shown) at the upper end if the interior cylinder 660 to rotate relative to the rail means 600 so that the bike unit B-1 can be steered side to side of the treadmill.

A tilt control means can be used to limit side to side tilting of the cylinders relative to the rail member, having in M-5 (FIG. 16) a sleeve threaded onto a necked down portion of the external cylinder 650A at its lower end, where the bottom face of the sleeve contacts the upper surface of the flat top 640T. If the sleeve 670 is tightened down against the flat top 640T, the bike unit can be held upright, although it still can be rotated and raised and lowered with respect to the external cylinder member 650. The tilt control of M-6 is similar to that illustrated in M-3, having adjustment screws 650S threaded into ears of the exterior cylinder 650B to set proper gaps from the flat top 640t.

Rail hazard cover means 680 comprising a flexible but non extendable member, such as a belt means, has its opposite ends connected to the carrier means 620A, or 620B and forms a loop that passes around guides 680G at the ends of the rail channel 600 to the space between the upper and lower runs of the road means 250. This belt means travels in the same direction as the carrier member, without hindering its mobility, but provides greater protection against possible bodily injury of children or even the rider who may otherwise pinch a finger or the like between the moving carrier member and the adjacent stationary frame structure.

Therefore, the present invention allows the bike unit B-1 to be raised or lowered when it rolls on uneven surfaces of the moving road means 250 and to lean and be moved from side to side while being steered, all while being held longitudinally in place on the road device R-1 and upright so as not fall down completely.

It may be noted that in all of the disclosed devices, the wheels and frictionally coupled rotatable members of the road device unit can be of durable material, and of suitable weight, to provide a gyroscopic rotational effect. Thus, when the rider stops pedaling the wheels the rotatable road device will continue to roll for some time to give the feeling of coasting on a real bicycle. Moreover, as the rider transmits a force against the road device related to the rider's own weight, the degree of difficulty in rotating the rotatable means is automatically adjusted somewhat to the weight of the rider.

The front and driven wheels of the illustrated bike unit, being supported on and frictionally coupled to the road means, give a feel similar to one actually riding a bicycle, as vibration from or bumps on the road device are transmitted to the bike unit itself, including the seat.

While the above description contains preferred embodiments of the invention, those skilled in the art will readily be able to change the dimensions and shapes of the various embodiments, and build from alternative materials. Accordingly, the scope of the invention is to be determined by the appended claims and their legal equivalents, and not by the examples which have been given.

I claim:

1. Indoor exercising apparatus for use with a conventional bike unit having front steering and rear drive wheels spaced apart on a wheel base, and pedals supported rotatably between the front and rear wheels, the exercising apparatus comprising the combination of
   a road device unit having stationary laterally spaced sides and a non-powered substantially free-wheeling endless treadmill defining an exposed upper run extended laterally between the spaced sides and longitudinally a distance greater than the wheel base of the bike unit;
   motion coordinator means coupling said bike unit and road device together, with both wheels simultaneously supported on the upper treadmill run; and
   said motion coordinator means comprising:
      rail means extended generally between the laterally spaced sides, with clearance overlying the upper run of the endless treadmill and underlying the bike unit proximate the rotatable pedals; and
      a pair of laterally rigid telescoping members, means securing one end of one telescoping member firmly relative to the bike unit proximate the rotatable pedals, means guiding the opposite end of the other telescoping member for free movement along the rail means and laterally of the endless treadmill, means allowing substantial relative rotation of the securing and guiding means about the longitudinal axis of the telescoping members, and means allowing only limited tilting of the telescoping members relative to the rail means;
      whereby said motion coordinator means is operable to hold the bike unit substantially fixed longitudinally on the treadmill while allowing lateral steering and limited tilting of the bike unit relative to the treadmill, to simulate riding the bike unit on a real road surface.

2. Indoor exercising apparatus according to claim 1, wherein the bike unit further comprises a crank-pedal housing rotatably suporting the pedals, and said securing means being in the form of spaced clamps adapted to be secured around the opposite ends of the crank-pedal housing.

3. Indoor exercising apparatus according to claim 2, wherein said spaced clamps each further comprises a pair of C-shaped members pivoted together at corresponding ends to allow the opposite ends to open and close relative to one another, and means to connect the opposite ends together when clamped around the crank-pedal housing.

4. Indoor exercising apparatus according to claim 1, wherein the bike unit further comprises a crank-pedal housing rotatably supporting the pedals, down tube and chain stay members connected off of the crank-pedal housing, and said securing means being in the form of spaced clamp members adapted to be secured to the down tube and chain stay members adjacent the crank-pedal housing.

5. Indoor exercising apparatus according to claim 1, wherein said rail means comprises elongated cavity means and said guiding means comprises a carrier member cooperating with the cavity means to be guided thereby, and said telescoping members being coupled to the carrier member.

6. Indoor exercising apparatus according to claim 5, wherein said elongated cavity means is cylindrical in shape and has an upwardly open slot, the carrier member comprising a spherical ball received in the cavity means and connected to the telescoping members by means extended through the open slot.

7. Indoor exercising apparatus according to claim 6, wherein said spherical ball and receiving cavity means is operable also for providing the means allowing substantial relative rotation of the securing and guiding means about the longitudinal axis of the telescoping members.

8. Indoor exercising apparatus according to claim 5, wherein said elongated cavity means is T-shaped and has an upwardly open slot and the carrier member comprises a plate received in the cavity, anti-friction means carried on the carrier member and cooperating with the rail means, and the plate being connected to the telescoping members by means extended through the open slot.

9. Indoor exercising apparatus according to claim 1, wherein the guiding means has means cooperating with the rail means to hold one of the telescoping members oriented to extend substantially vertically therefrom, and wherein the means allowing only limited tilting of the telescoping members relative to the rail means has a pivot connection between the other telescoping member and the securing means and is at a location spaced above the rail means and close to the pedals.

10. Indoor exercising apparatus according to claim 8, further comprising a flexible but nonextendable member connected to the carrier member and extended transverse to and looped around the endless treadmill, said nonextendable member cooperating with the rail means to be guided thereby and being exposed only through the upwardly open slot of the guide means, for defining a protective cover over the carrier member.

11. Indoor exercising apparatus according to claim 1, further comprising means pivoting one of the telescoping members relative to the rail means and surface means spaced from the pivoting means, and wherein the tilt limiting means comprising a member threaded relative to one of the telescoping members and disposed to be threaded toward and away from the surface means to defined adjustable gaps, each gap being set to provide a specific degree of allowable tilt of the telescoping members relative to the rail means.

12. Indoor exercising apparatus for use with a conventional bike unit having front steering and rear drive wheels supported spaced apart on a wheel base, and pedals supported rotatably between the front and rear wheels, the exercising apparatus comprising the combination of
   of road device unit having stationary laterally spaced sides and a non-powered substantially free-wheeling endless treadmill defining a generally exposed upper run extended laterally between the spaced sides and longitudinally a distance greater than the wheel base of the bike unit;

motion coordinator means coupling said bike unit and road device together, with both wheels simultaneously supported on the upper treadmill run; and said motion coordinator means comprising: a rail extended generally between the laterally spaced sides, with clearance overlying the upper run of the endless treadmill and underlying the pedals, and a carrier guided on the rail to move laterally of the endless treadmill;

a pair of laterally rigid telescoping members; means securing one of the telescoping members relative to the bike unit proximate the pedals, and means securing the other telescoping member relative to the carrier;

means allowing substantial relative rotation of the securing means about the longitudinal axis of the telescoping members; and means allowing limited tilting, laterally of the longitudinal axis of the telescoping members, of the securing means at the bike unit relative to the carrier; said tilt limiting means comprising a surface fixed relative to the rail and a member threaded relative to the other telescoping member and disposed to be threaded toward and away from the surface to defined adjustable gaps, each gap being set to provide a specific degree of allowable tilt of the telescoping members relative to the rail;

whereby said motion-coordinator means is operable to hold the bike unit substantially fixed longitudinally on the treadmill while allowing lateral steering and limited tilting of the bike unit relative to the treadmill, to simulate riding the bike unit on a real road surface.

* * * * *